United States Patent
Trakas

(10) Patent No.: US 8,840,396 B2
(45) Date of Patent: *Sep. 23, 2014

(54) SELF-PROPELLING SPRUE BAR SHUTOFF DEVICE

(76) Inventor: Panos Trakas, Addison, IL (US)

(*) Notice: Subject to any disclaimer, the term of this patent is extended or adjusted under 35 U.S.C. 154(b) by 713 days.

This patent is subject to a terminal disclaimer.

(21) Appl. No.: 13/081,597

(22) Filed: Apr. 7, 2011

(65) Prior Publication Data

US 2012/0256352 A1    Oct. 11, 2012

(51) Int. Cl.
  *B29C 45/46*   (2006.01)
  *B29C 45/27*   (2006.01)

(52) U.S. Cl.
  CPC ................................. *B29C 45/2758* (2013.01)
  USPC ........................................................ 425/567

(58) Field of Classification Search
  USPC ................. 425/562, 563, 564, 565, 566, 567
  See application file for complete search history.

(56) References Cited

U.S. PATENT DOCUMENTS

| | | | |
|---|---|---|---|
| 5,458,843 A | 10/1995 | Brown et al. | |
| 5,494,254 A | 2/1996 | Dominka | |
| 5,587,076 A | 12/1996 | Herzog | |
| 5,968,562 A | 10/1999 | Schad et al. | |
| 6,793,480 B2 | 9/2004 | Dominka | |
| 7,165,968 B2 | 1/2007 | Serniuck | |
| 7,357,172 B2 | 4/2008 | Teng et al. | |
| 7,393,198 B2 | 7/2008 | Niewels et al. | |
| 7,393,479 B2 | 7/2008 | Mai | |
| 7,396,227 B2 | 7/2008 | Nakaya et al. | |
| 7,416,402 B2 | 8/2008 | Babin | |
| 7,427,197 B2 * | 9/2008 | Ciccone et al. | 425/564 |
| 7,678,320 B2 | 3/2010 | Klobucar | |
| RE41,280 E | 4/2010 | Trakas | |
| 7,775,789 B2 * | 8/2010 | Trakas | 425/567 |
| 7,850,895 B2 * | 12/2010 | Trakas | 264/328.9 |
| 2006/0003038 A1 | 1/2006 | Serniuck | |

OTHER PUBLICATIONS

Plastic Process Equipment, Inc., 6 Stock Screw Tip Styles, downloaded from www.ppe.com/09cat/0852-0853.pdf on Jan. 30, 2009.
Herzog Systems AG, Non-return Valve Technical Description, downloaded from http://www.herzog-ag.com/Pdfs/Technical_English/2010/15_2_Non-returnvalves.pdf on May 12, 2011.

* cited by examiner

Primary Examiner — Tim Heitbrink
(74) Attorney, Agent, or Firm — Perkins IP Law Group LLC; Jefferson Perkins

(57) ABSTRACT

An injection molding shutoff assembly includes a chamber containing a movable body that is biased to a rear position in the chamber by a magnet in the movable body. In the rear position, the movable body provides a seal and prevents flow of molten plastic through the assembly. When the movable body is in a forward position, one or more passages permit flow of the molten plastic around the movable body and to an exit in the chamber, leading to one or more molds. An injection molding machine nozzle tip has a beveled front end which, when in an engaged position, seals with an exterior seat of the assembly block defining the chamber and protrudes into the chamber to prop the movable body to the forward position. A portion of the assembly block proximate the opening for the nozzle tip is made of ferromagnetic material, while the rest is not.

2 Claims, 7 Drawing Sheets

SELF-PROPELLING SPRUE BAR SHUTOFF DEVICE

BACKGROUND OF THE INVENTION

The present invention relates to injection molding machines, and in particular, a shutoff device for use in a system that transports molten polymer from the molding machine to at least one stack mold by way of a sprue bar.

It is known to provide stack molds in injection molding machines in which there are at least two sets of molding chambers which divide along separate parting lines. One method of delivering molten polymer to all of the molding chambers in a stack mold is by a sprue bar. A sprue bar extends from a sprue of the molding machine, along the axis of the stack mold assembly, to a central manifold located between at least two mold plates in the stack. A plurality of nozzles in turn provide conduits for the molten polymer from the manifold to each of the molding cavities, with some of the nozzles extending forward in an axial direction to those mold cavities which are forward of the manifold, and the rest of the nozzles extending rearward in an opposite axial direction to those mold cavities which are rearward of the manifold. A representative sprue bar-equipped stack mold is illustrated in FIG. 2 of U.S. Pat. No. 7,427,197 to Ciccone et al.

After the molten polymer has been injected under pressure into the molding chambers, the system is depressurized, the cavities are cooled, the plates forming the molding chambers are separated, and the molded piece or pieces are ejected. During this process it is necessary to disconnect the sprue from the sprue bar. Upon disconnection, molten polymer or "drool" will often be produced from the orifice of the sprue bar, resulting in the loss of raw material and additional cleanup costs. If enough molten polymer drools from the sprue bar, it may solidify and prevent complete closure of the mold, causing damage to the equipment, expensive repairs, and lost production. At the very least, this drooling effect requires removal by a technician, increasing the time between cycles.

U.S. Pat. Nos. 7,775,789 and 7,850,895, which are expressly incorporated by reference herein, address the elimination or reduction of drool by the provision of a shutoff assembly with a self-reciprocating valve. However, if a more positive shutoff is desired by the operator or needed, such as where the molten polymer has a low viscosity, further improvements can still be made.

SUMMARY OF THE INVENTION

The present invention provides an improved self-propelling sprue bar shutoff device that reduces or eliminates drool.

According to one aspect of the invention, an injection mold shutoff assembly comprises an assembly block defining a chamber with a rear end and a forward end. An exterior seat is formed in the assembly block to be adjacent to the rear end of the chamber. A first opening in the block communicates the exterior seat to the rear end of the chamber. A sealing surface of the chamber surrounds the first opening. A second opening in the assembly block, remote from the first opening, opens onto the forward end of the chamber.

A movable body within the chamber is reciprocally movable between a rear position that is proximate to the first opening and a forward position that is remote from the first opening. A sealing surface of the movable body seals with the sealing surface on the chamber wall when the movable body is in the rear position. The movable body includes a magnet with a center which is adapted to assume a rear magnet position when the movable body is in the rear position. The assembly block is formed by a ferromagnetic portion and a non-ferromagnetic portion. At least a majority of the ferromagnetic portion is disposed rearwardly of the rear magnet position such that the interaction of the magnet with the ferromagnetic portion will bias the movable body to the rear position.

Preferably, the movable body includes a non-ferromagnetic outer layer or shell and the magnet takes the form of a solid core which can move freely within the shell. The core will rotate until the magnetic poles thereof are in alignment with the magnetic field which passes through it and the ferromagnetic portion of the assembly block, thereby assuring proper operation and preventing jamming.

According to another aspect of the invention, an injection molding machine nozzle tip of the shutoff assembly has a forward end of integral construction which forwardly terminates in an abutting surface. A beveled side surface of the nozzle tip front end extends rearwardly from this abutting surface. An assembly block defines a chamber in which a movable body reciprocates between a rear position and a forward position. An exterior seat of the assembly block seals to the injection molding machine nozzle tip when the nozzle tip is in an engaged position. The exterior seat is spaced from the nozzle tip when the nozzle tip is withdrawn to a nonengaged position.

A first opening in the assembly block provides fluid communication from the exterior seat to the chamber through an entry wall. A first sealing surface of the entry wall surrounds the first opening. The movable body has a second sealing surface that is sealable with the first sealing surface when the movable body is in the rear position.

An exit wall of the chamber includes a second opening formed therein and is in fluid communication with a receiving unit, such as a sprue bar. The abutting surface of the nozzle tip contacts the movable body when the nozzle tip is in the engaged position so as to prevent the movable body from moving to the rear position. The movable body is biased toward the rear position, as by magnetic force and molten polymer, such that when the nozzle tip is withdrawn to the nonengaged position, the sealing surface on the movable body seals with the sealing surface on the chamber entry wall, closing the first opening.

Preferably, the front end of the nozzle tip has an axial bore. A plurality of angularly divergent bores are formed in the abutting surface and the side surface of the nozzle tip front end so as to communicate with the nozzle tip axial bore.

In a further aspect of the invention, an injection molding shutoff assembly comprises an injection molding machine nozzle tip having a forward end that is formed around an axis. The forward end terminates in an abutting surface. A side surface of the forward end, which extends rearwardly from the abutting surface, is formed as a surface of rotation around the axis, with a radius which decreases continuously and monotonically in an axial forward direction. Preferably this surface of rotation conforms to a cone. The side surface has a predetermined axial length.

An assembly block defining a chamber has a rear end, a forward end, and an entry wall that is disposed at the rear end of the chamber. A first opening is formed in the entry wall of the chamber and is disposed to be on the axis. A first sealing surface of the entry wall is formed around the first opening.

The assembly block has an exterior surface with an exterior seat that is formed to be coaxial with and in communication with the first opening. A forward section of the exterior seat is formed as a noncylindrical surface of rotation which is matable to the side surface of the forward end of the nozzle tip. A movable body is reciprocally movable within the chamber between a rear position and a forward position. The movable body has a second sealing surface that is matable to the first sealing surface of the entry wall when the movable body is in the rear position.

The forward section of the exterior seat of the assembly block has an axial length which is less than the axial length of the forward surface of the forward end, such that when the forward end is mated with the forward section of the exterior seat, the side surface of the nozzle tip extends forwardly into the chamber, propping the movable body toward the forward position.

In another aspect of the invention, a method for connecting and disconnecting an injection molding machine nozzle tip to and from a shutoff assembly having a chamber includes the steps of biasing a movable body within the chamber with a magnetic force to a rear position proximate to a first opening in the chamber. The method further comprises connecting the injection molding machine nozzle tip to the assembly, flowing molten polymer, decompressing the receiving unit, and disconnecting the injection molding machine nozzle tip from the assembly.

The step of connecting the injection molding machine nozzle tip includes the substeps of mating the nozzle tip to an exterior seat in the assembly block. The seat is in fluid communication with the chamber through a first opening that extends from the seat to the chamber. A first sealing surface surrounds the first opening.

Concurrently with the substep of mating, the step of connecting the injection molding machine nozzle tip includes the substeps of contacting an abutting surface of a forward end of the nozzle tip with a movable body within the chamber and pushing the movable body from a rear position that is proximate to the first opening toward a forward position that is remote from the first opening. Molten polymer flows through the first opening to a second opening in the chamber and then to at least one receiving unit that is in fluid communication with the second opening.

The step of decompressing the mold comprises the substeps of ceasing the flow of the molten polymer from the first opening toward the second opening, maintaining contact between the abutting surface and the movable body, and allowing molten polymer to flow from the second opening toward the first opening.

The step of disconnecting the injection molding machine from the assembly includes the substeps of withdrawing the forward end of the nozzle tip from the chamber through the first opening. Concurrently with the substep of withdrawing, the movable body moves to the rear position by means of at least one of the magnetic force and molten polymer flowing back from the second opening toward the first opening, and sealing the second sealing surface of the movable body with the first sealing surface of the entry wall.

By biasing the movable body with a magnet, the preferred assembly of the invention is more adaptable to valve the flow of a polymer of a relatively low viscosity. The valve no longer entirely relies on molten polymer back-pressure to seat the movable body to the rear opening of the assembly block after the nozzle tip is withdrawn. The preferred, beveled front end of the nozzle tip has a simpler and robust construction than prior art nozzle tips, some of which include a separately machined elongate stem that is more vulnerable to breakage caused by misalignment between the exterior seat in the assembly block.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
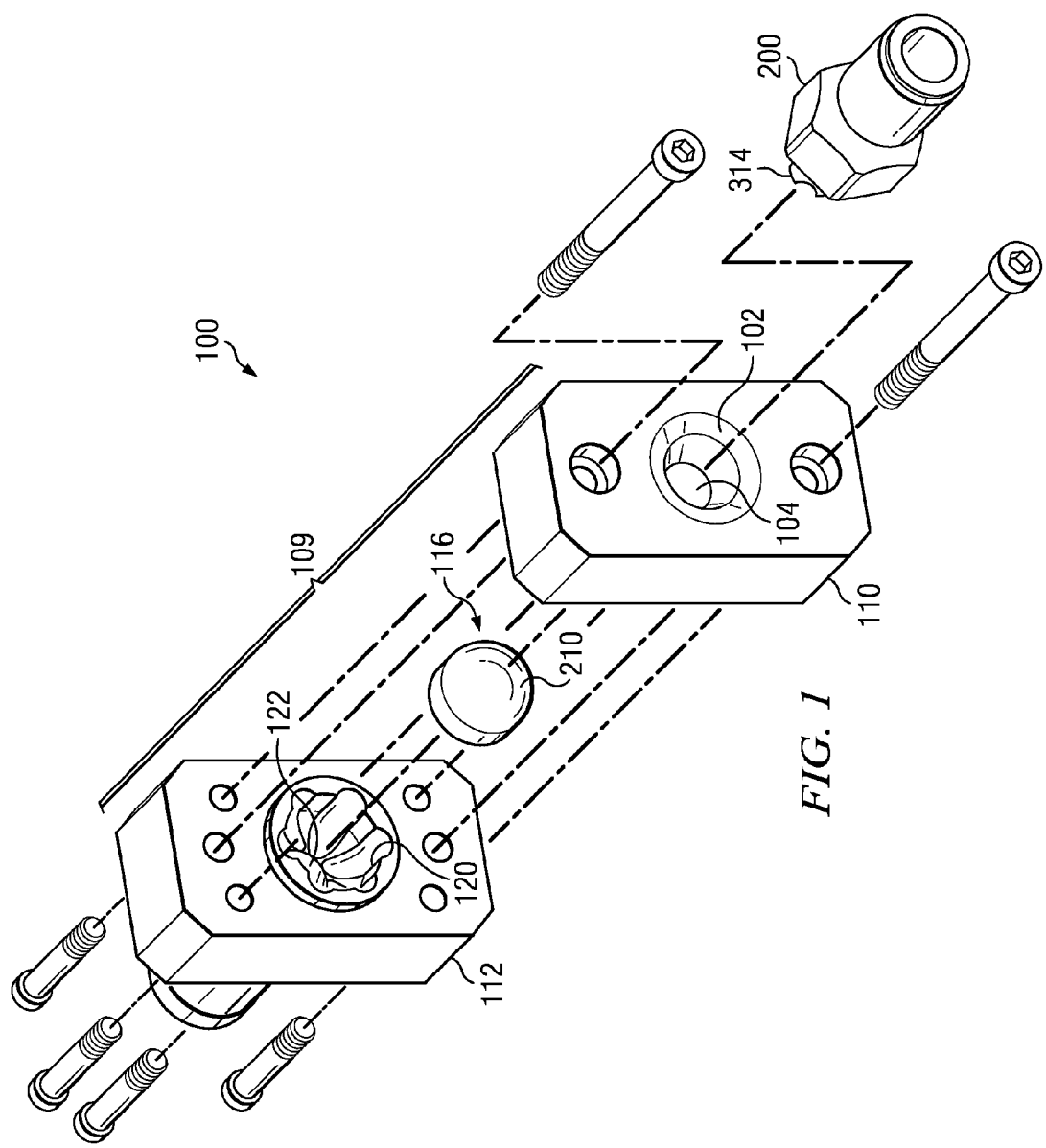
FIG. 1 is an exploded front isometric view of a sprue bar shutoff device according to the invention.
Figure 2:
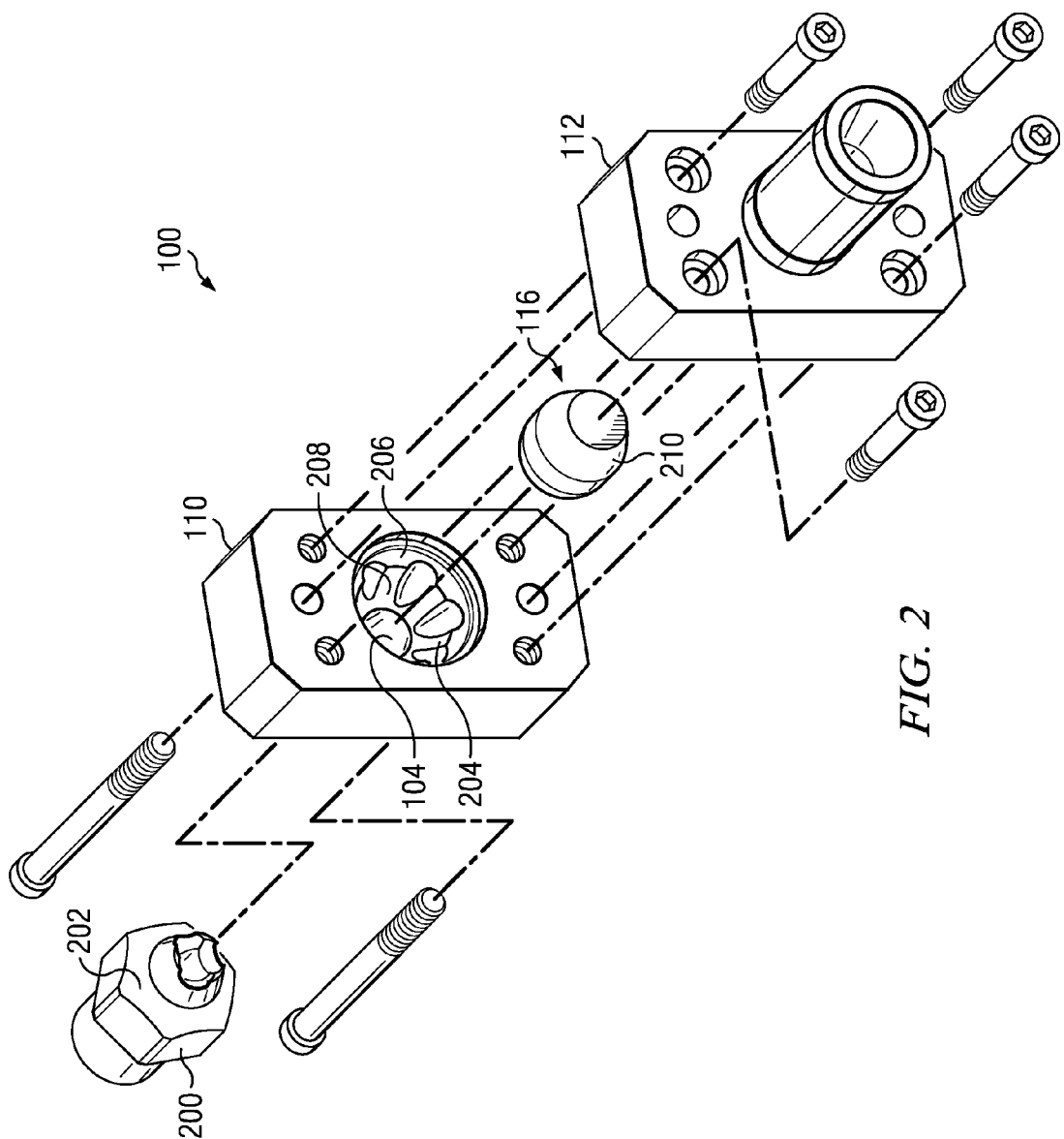
FIG. 2 is an exploded rear isometric view of the assembly shown in FIG. 1.

Referring to FIGS. 1, 2, 4A, and 4B, in a first embodiment of the invention, an injection mold shutoff assembly, indicated generally at 100, includes an assembly block 109. Block 109 defines a chamber 206 which has a rear end 406 and a forward end 408. Preferably, the assembly block 109 is made from at least a first assembly piece 110 and a second assembly piece 112. At least a portion of the first piece 110 is made of a ferromagnetic material, and the second piece 112 is made of a non-ferromagnetic (such as paramagnetic or diamagnetic) material. As used herein, a ferromagnetic material is one that is capable of forming a permanent magnet or is attracted to a magnet.

The assembly 100 further comprises an exterior seat 102 formed in the assembly block 109 near the rear end 406 of the chamber 206. More preferably, the exterior seat 102 is formed in the first piece 110 of the assembly block 109. The exterior seat 102 is sealable to a front mating surface 202 of an injection molding machine nozzle tip 200 when the nozzle tip 200 is in an engaged position. The nozzle tip 200 is attached as by threading to a nozzle (not shown). Nozzle tip 200 is spaced from the assembly block 109 when not engaged. A first opening 104 in an entry wall 204 of a chamber 206 provides fluid communication from the exterior seat 102 to the rear end 406 of the chamber 206.

The chamber 206 is preferably formed by joining the first and second assembly block pieces 110 and 112. The entry wall 204 has a first sealing surface 208 in chamber 206 which surrounds the first opening 104. The chamber 206 contains a body 116 that can move within the chamber between a rear position that is proximate to the first opening 104 and a forward position that is remote from the first opening 104. See FIGS. 4A and 5, respectively. The movable body 116 includes a magnet 316 (see FIGS. 3B and 4B) with a center 318 that is adapted to assume a rear magnet position 410 (FIG. 4B) when the movable body 116 is in the rear position and a forward magnet position 412 (FIG. 5) when the movable body 116 is in the forward position. The chamber 206 also has an exit wall 120 with a second opening 122 that provides fluid communication with a receiving unit such as a sprue bar (not shown).

Figure 4A:
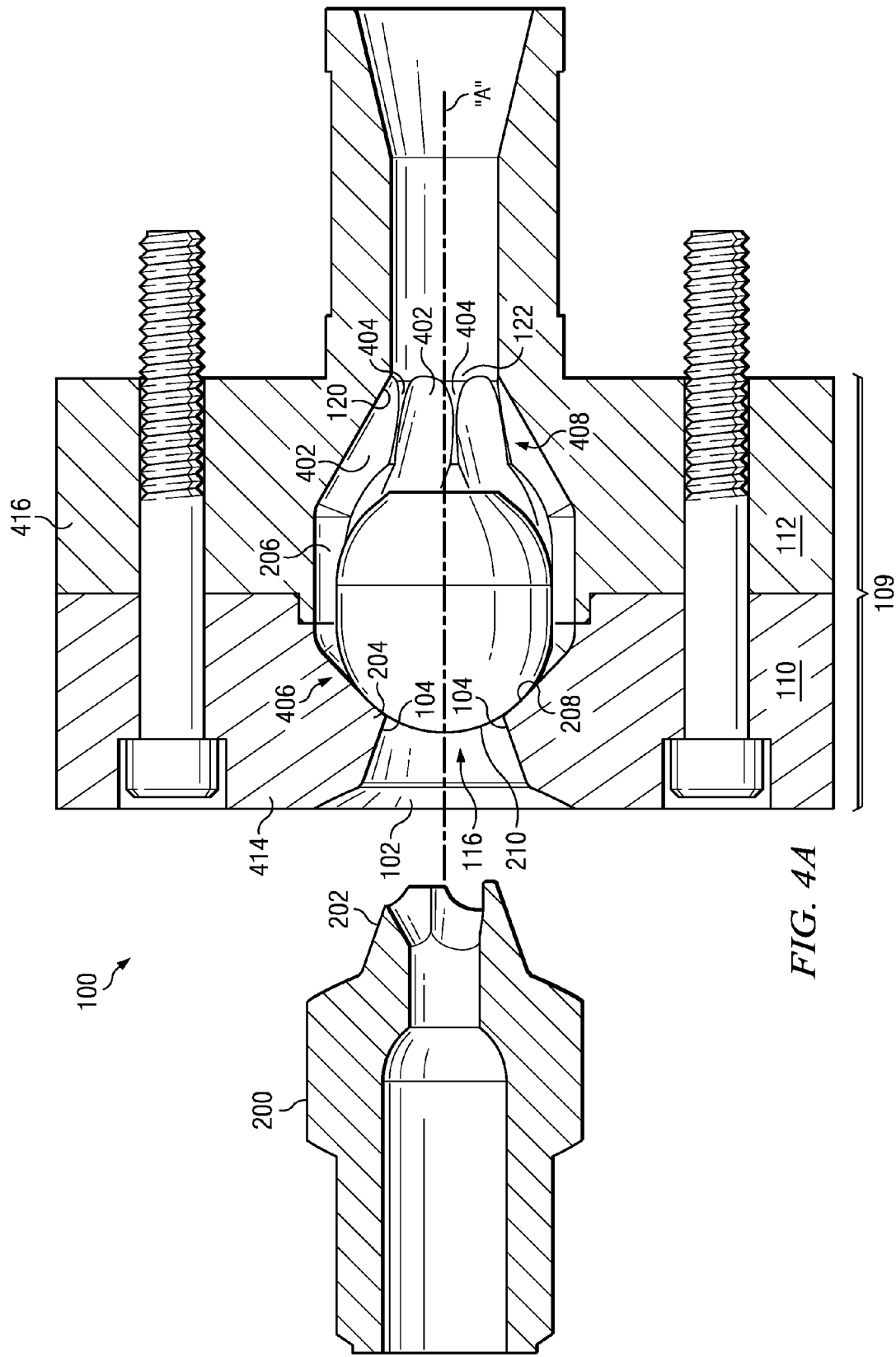
FIG. 4A is an axial sectional view of the sprue bar assembly shown in FIG. 1, showing a movable body in a rear position and a nozzle tip in a nonengaged position.

As described above, the assembly block 109 has a ferromagnetic portion 414 and a nonferromagnetic portion 416 (FIG. 4A). At least a majority of the ferromagnetic portion 414 should be disposed to be rearward of the magnet center 318 while in rear magnet position 410 such that the interaction of the magnet 316 with the ferromagnetic portion 414 will bias the movable body 116 to the rear position. More preferably, at least some of the first sealing surface 208 is formed by the ferromagnetic portion 414 of the assembly block 109. The proximity of the magnet 316 to a ferromagnetic sealing surface 208 will concentrate magnetic lines of force between these two structures. In alternative embodiments (not shown) the ferromagnetic portion 414 can constitute less than all of the assembly block piece 110, but most or all of the ferromagnetic portion 414 preferably should be disposed rearwardly of magnet center 318 when center 318 is in rear position 410.

Figure 3A:
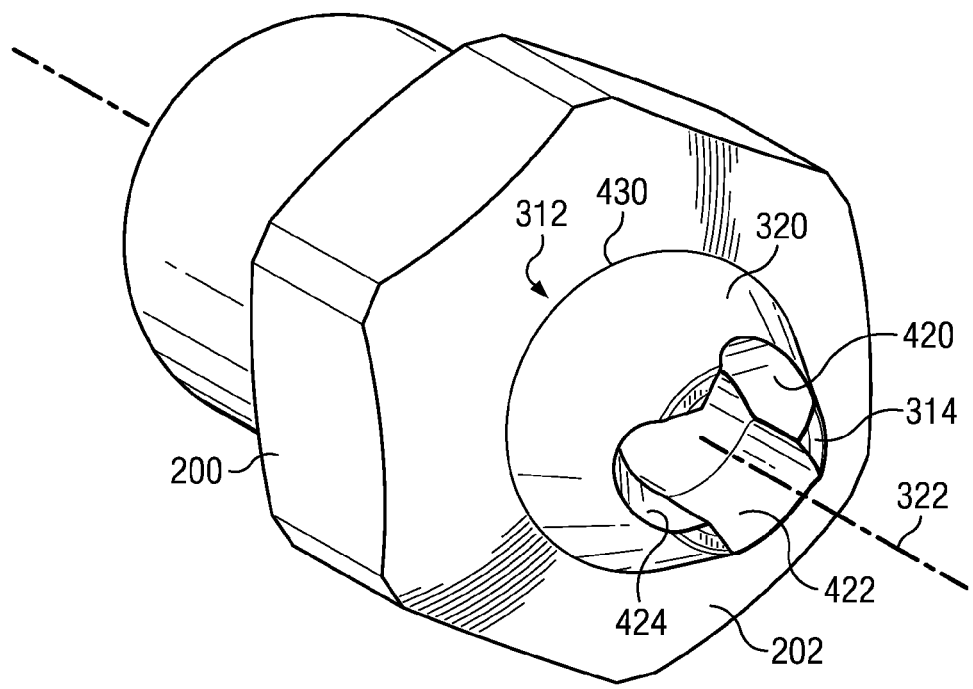
FIG. 3A is a partial isometric view of a nozzle tip according to the invention.

Referring to FIG. 3A, the injection molding machine nozzle tip 200 has a forward end 312 which forwardly terminates in an abutting surface 314. As described above, the exterior seat 102 of the first piece 110 of the assembly 109 is sealable to the front mating surface 202 of the injection molding machine nozzle tip 200. The front mating surface 202 is spaced from the exterior seat 102 when not engaged. When the forward end 312 of nozzle tip 200 is inserted into the first opening 104, the abutting surface 314 of the forward end 312 will contact the movable body 116 since the movable body 116 is in the rear position. As the forward end 312 is further inserted, the abutting surface 314 will push the movable body 116 out of the rear position, making it possible for the polymer to flow from the first opening 104 through chamber 206 to the second opening 122 and preventing the movable body 116 from returning to the rear position.

Figure 4B:
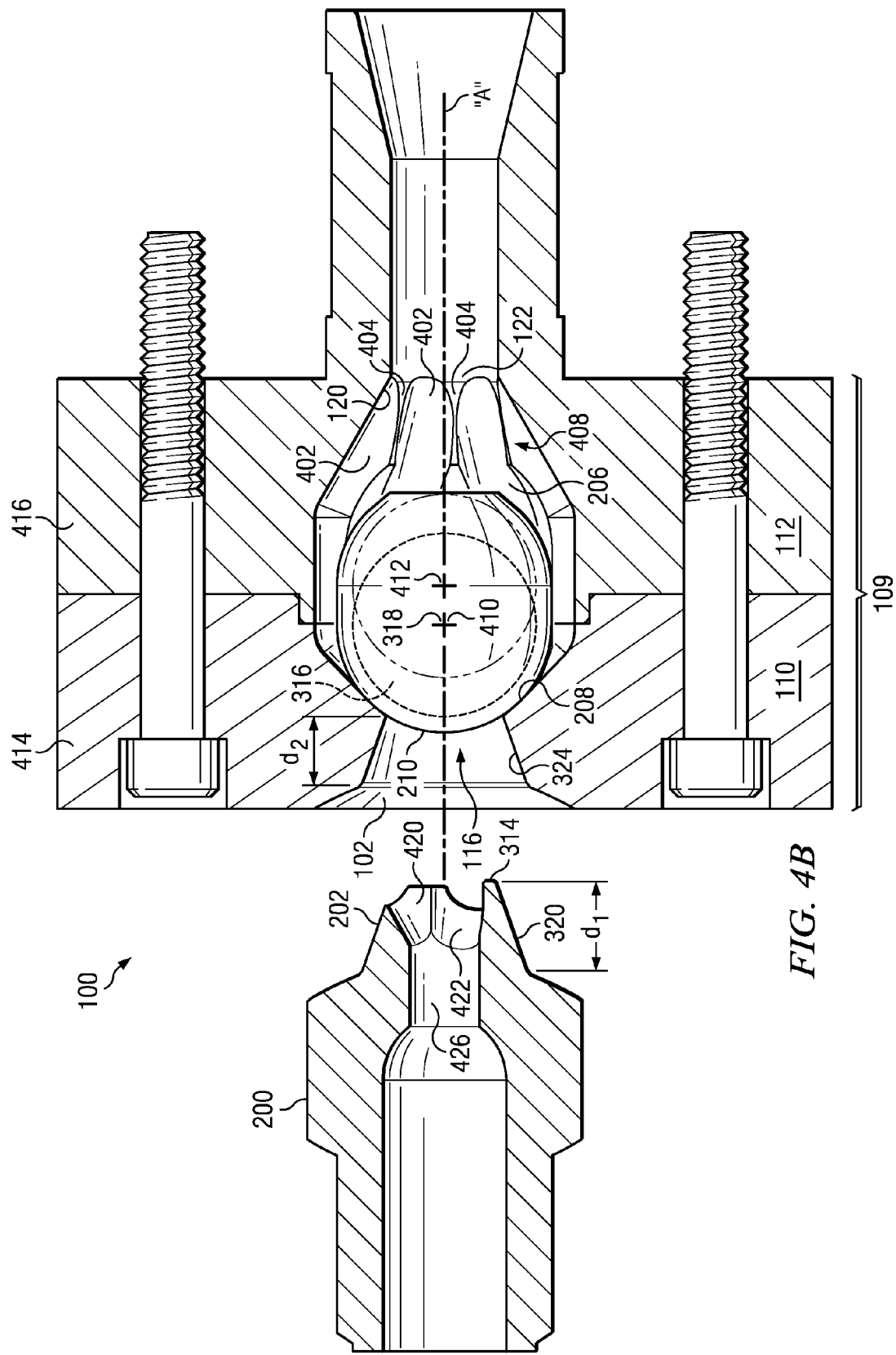
FIG. 4B is the axial sectional view of FIG. 4A, further showing the center of the magnet in a rear magnet position and a forward magnet position.

More preferably, the forward end 312 of the nozzle tip 200 is formed around an axis 322. The forward end 312 has a radially exterior side surface 320 that is formed as a non-cylindrical surface of rotation around axis 322 and has a radius which decreases continuously and monotonically in an axial forward direction, the side surface 320 having an axial length $d_1$ (FIG. 4B). A forward section 324 of the exterior seat 102 can be formed as a non-cylindrical surface of rotation which is matable to the side surface 320 of the forward end 312. As used herein, the term "non-cylindrical surface of rotation" refers to any surface of rotation around axis 322 whose radius from the axis does not remain constant as a function of distance along the axis. The side surface 320 generally is tapered or beveled in a forward direction.

As shown in FIG. 4B, the forward section 324 of the exterior seat 102 of the assembly block 109 has an axial length $d_2$ which is less than the axial length $d_1$ of the side surface 320 of the forward end 312, such that when the forward end 312 is mated with the forward section 324 of the exterior seat 102, the side surface 320 of the nozzle tip 200 extends forwardly into the chamber 206, propping the movable body 116 toward the forward position. Most preferably, the side surface 320 of the forward end 312 and the forward section 320 of the exterior seat 102 both conform to a cone, although these surfaces can have complementarily curved axial profiles instead.

Figure 3B:
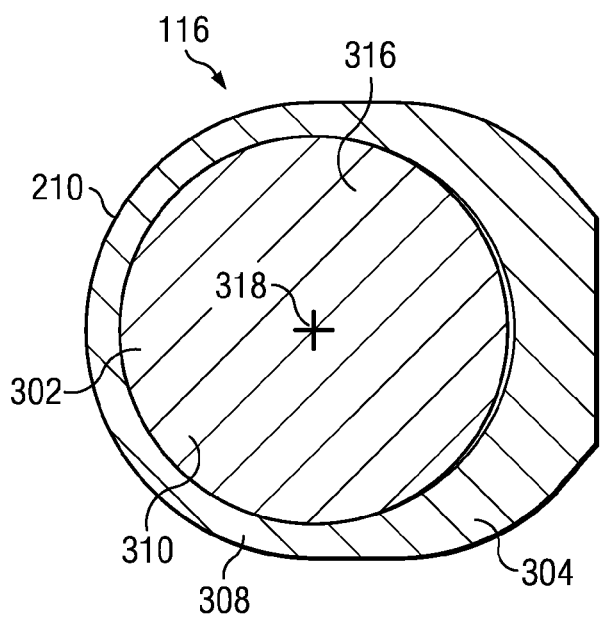
FIG. 3B is an axial sectional view of a movable body according to the invention.

Referring to FIG. 3B, at least a portion 302 of the movable body 116 is preferably made of a permanently magnetized material. The movable body 116 has a second sealing surface 210 that seals with the first sealing surface 208 (FIG. 4A) of the entry wall 204 when the movable body 116 is in the rear position in chamber 206. The movable body 116 may be selected to be of any shape capable of sealing with the first sealing surface 208 of the entry wall 204 including, but not limited to, an ellipsoid, a sphere, a cone, a pyramid or a wedge. The shapes of the first and second sealing surfaces 208, 210 need only be complementary.

The magnet 302 of the movable body 116 is attracted to the ferromagnetic portion 414 of the first piece 110 such that the movable body 116 is magnetically biased toward the rear position.

Preferably, the movable body 116 also has a non-ferromagnetic portion 304. More preferably, the non-ferromagnetic portion 304 is an outer layer or shell 308 of the movable body 116 and the ferromagnetic portion 302 of the movable body 116 is a solid metal core 310. Even more preferably, the solid metal core 310 is loose inside the shell 308. This allows ferromagnetic portion 302 to freely rotate within shell 308, permitting the poles of the magnetic core 310 to align with the magnetic field passing through itself and ferromagnetic portion 414 of the first piece 110 without affecting the motion or orientation of the movable body 116. This ability to reorient the magnetic core 310 prevents the movable body 116 from becoming lodged or jammed within the chamber 206 and promotes correct operation.

As described above, the movable body 116 will preferably be biased toward the rear position by the magnetic forces operating between the ferromagnetic portion 414 of the first piece 110 of the assembly 109. Alternatively, the movable body 116 may be biased toward the rear position with a spring or incline. Regardless of the method of biasing, when the nozzle tip 200 is in the nonengaged position and the forward end 312 having the abutting surface 314 is removed from the first opening 104, the second sealing surface 210 seals with the first sealing surface 208, thereby closing the first opening 104.

The forward end 312 of nozzle tip 200 will prop the movable body 116 to some point in between the forward and rear positions. It is preferred that nozzle tip 200 not prop the movable body 116 all the way to the forward position, to permit some play in the movable components. During injection molding operations, the flow of the molten polymer will apply additional forward pressure to the movable body 116 and may push the movable body 116 further forward and completely into the forward position.

Figure 5:
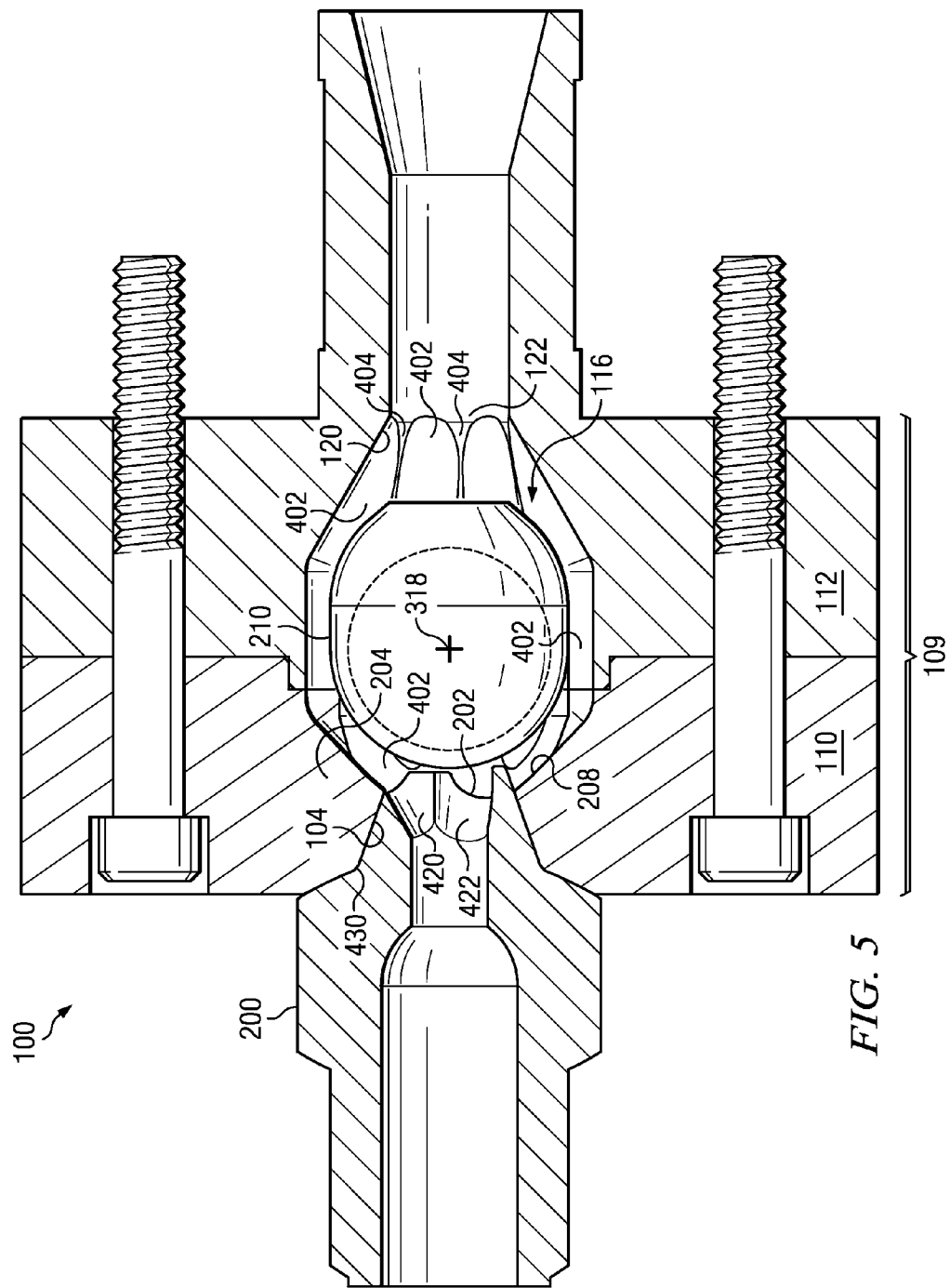
FIG. 5 is an axial sectional view similar to that shown in FIGS. 4A and B, but showing the movable body in a forward position and the nozzle tip in an engaged position.

Referring to FIGS. 4A, 4B, and 5, one or more passages 402 of the chamber 206 formed into the first and second pieces 110 and 112 of the assembly 109 extend from the entry wall 204 to the exit wall 120. This provides fluid communication between the first opening 104 and the second opening 122, thereby transporting molten polymer around the movable body 116 when the movable body 116 is not in the rear position (FIG. 5). The passages 402 are sealed from the first opening 104 of the chamber 206 by the movable body 116 when the movable body 116 is in the rear position (FIGS. 4A and 4B).

The chamber 206 may further include a plurality of ridges 404 that extend from the entry wall 204 to the exit wall 120 so as to constrain the movement of the movable body 116 along a path of motion, preferably a straight line. More preferably, the passages 402 and ridges 404 are placed circumferentially around an axis 'A' defined by the path of motion and the passages 402 are spaced from each other by the ridges 404.

When the forward end 312 is withdrawn from the first opening 104, the movable body 116 moves to the rear position, allowing the first and second sealing surfaces 208, 210 to contact each other, thereby closing the first opening 104.

In a preferred embodiment, and as seen in FIGS. 3A and 4B, a plurality of angularly spaced apart, divergent bores 420, 422 and 424 are formed in the abutting surface 314 and the side surface 320 of nozzle tip 200 to extend rearwardly and radially inwardly so as to join with a central axial bore 426 of the nozzle tip 200. The divergent bores 420-424 are formed at respective angles to axis A and their axes further are angularly separated from each other. In the illustrated embodiment these bores 420-424 are partially fused (they form lobes of a combined cavity) but yet begin to define divergent paths.

When the nozzle tip 200 is in the engaged position as seen in FIG. 5, all of the divergent bores 420-424 will clear sealing surface 208 in the entry wall.

Figure 6:
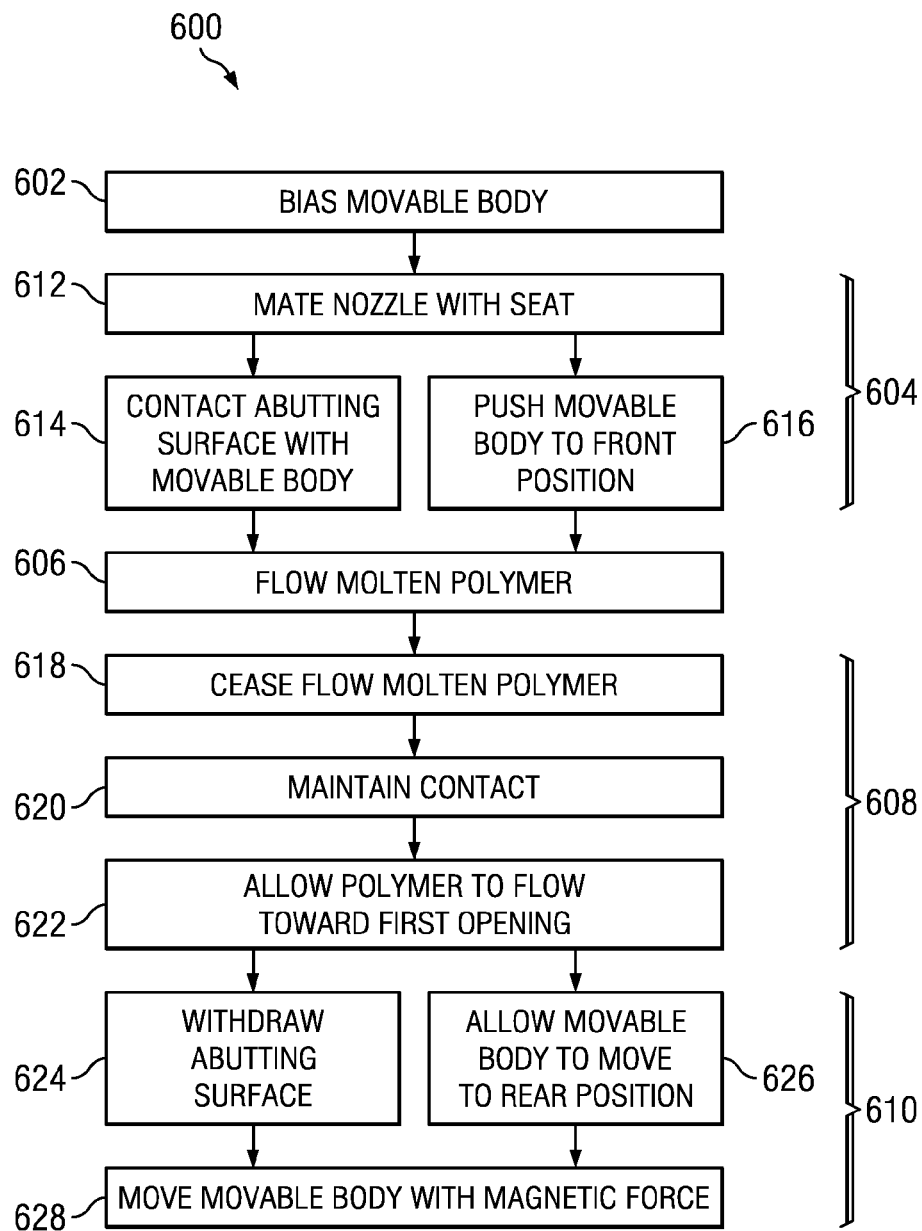
FIG. 6 is a flow diagram showing a method for connecting and disconnecting an injection molding machine to and from a shutoff assembly.

Referring to FIG. 6, in another aspect of the invention, a method (600) for connecting and disconnecting an injection molding machine nozzle tip 200 to and from a shutoff assembly 100 includes the steps of biasing (602) the movable body 116 within the chamber 206 with a magnetic force to a rear position, connecting (604) the injection molding machine nozzle tip 200 to the assembly 100, flowing (606) molten polymer through the first opening 104 to a second opening 122 in an exit wall 120 of the chamber 206 and on to a receiving unit (not shown) such as a mold or sprue bar that is in fluid communication with the second opening 122, decompressing (608) the receiving unit, and disconnecting (610) the injection molding machine nozzle tip 200 from the assembly 100.

More specifically, the step of connecting (604) comprises the substeps of mating (612) the nozzle tip 200 to an exterior seat 102 in the assembly 109. The seat 102 is in fluid communication with the chamber 206 through the first opening 104 that extends from the seat 102 to the chamber 206. A first sealing surface 208 surrounds the first opening 104.

The substep of mating (612) comprises the substeps of contacting (614) an abutting surface 314 of the forward end 312 of the nozzle tip 200 with the movable body 116 and pushing (616) the movable body 116 from the rear position towards the forward position, which substeps occur concurrently.

Once the injection molding process is ready to begin, molten polymer flows (606) through the first opening 104 through channels 402 to the second opening 122 of the chamber 206 and then to one or more receiving units.

At the conclusion of the injection of the molten polymer, the receiving unit is then decompressed. The step of decompressing (608) comprises the substeps of ceasing (618) the flow of molten polymer from the first opening 104 toward the second opening 122, maintaining (620) contact between the abutting surface 314 and the movable body 116, and allowing (622) molten polymer to flow from the second opening 122 toward the first opening 104.

The step of disconnecting (610) comprises the substeps of withdrawing (624) the forward end 312 of the nozzle tip 200 from the chamber 206 through the first opening 104 and, concurrently with said step of withdrawing (624), allowing (626) the movable body 116 to move to the rear position as biased by magnetic force, the molten polymer flowing back from the second opening 122 toward the first opening 104, or both, and sealing (628) the first sealing surface 208 on the chamber wall with the second sealing surface 210 on the movable body.

In summary, the method and assemblies described herein decrease material loss due to drooling, increase reliability, and lower maintenance costs. They may be used anywhere a shutoff for molten polymer is required including, but not limited to sprue bars and hot runners. The present invention reduces damage due to any misalignment of the nozzle tip relative to the external seat for it in the assembly block or valve body, and has particular application to polymers with relatively low viscosities.

While illustrated embodiments of the present invention have been described above and illustrated in the appended drawings, the present invention is not limited thereto but only by the scope and spirit of the appended claims.

I claim:

1. An injection molding shutoff assembly, comprising:
an injection molding machine nozzle tip having a forward end formed around an axis, the forward end terminating in an abutting surface, a side surface of the forward end of the nozzle tip extending rearwardly from the abutting surface, the side surface formed as a noncylindrical surface of rotation around the axis and having a radius which decreases continuously and monotonically in an axial forward direction, the side surface having an axial length;
an assembly block defining a chamber with a rear end and a forward end, an entry wall disposed at the rear end of the chamber and an exit wall disposed at the forward end of the chamber, a first opening formed in the entry wall of the chamber and disposed on the axis, a first sealing surface of the entry wall formed around the first opening;
the assembly block having an exterior surface, an exterior seat formed in the exterior surface to be coaxial with and communicating with the first opening, a forward section of the exterior seat formed as a noncylindrical surface of rotation which is matable to the side surface of the forward end of the nozzle tip;
a movable body reciprocable within the chamber between a rear position and a forward position, the movable body having a second sealing surface matable to the first sealing surface of the entry wall when the movable body is in the rear position;
the forward section of the exterior seat of the assembly block having an axial length which is less than said axial length of the side surface of the forward end, such that when the forward end is mated with the forward section of the exterior seat, the forward surface of the nozzle tip extends forwardly into the chamber, propping the movable body toward the forward position.

2. The injection molding shutoff assembly of claim 1, wherein the side surface of the forward end of the nozzle tip and the forward section of the exterior seat of the assembly block conform to a cone.

* * * * *